(12) United States Patent
Cesarano

(10) Patent No.: US 9,823,655 B2
(45) Date of Patent: Nov. 21, 2017

(54) UNMANNED VEHICLES, SYSTEMS, APPARATUS AND METHODS FOR CONTROLLING UNMANNED VEHICLES

(71) Applicant: Proxy Technologies, Inc., Reston, VA (US)

(72) Inventor: Patrick C. Cesarano, Washington, DC (US)

(73) Assignee: PROXY TECHNOLOGIES, INC., Reston, VA (US)

(*) Notice: Subject to any disclaimer, the term of this patent is extended or adjusted under 35 U.S.C. 154(b) by 0 days.

(21) Appl. No.: 15/206,228

(22) Filed: Jul. 9, 2016

(65) Prior Publication Data

US 2017/0227957 A1    Aug. 10, 2017

Related U.S. Application Data

(60) Provisional application No. 62/291,344, filed on Feb. 4, 2016.

(51) Int. Cl.
| | |
|---|---|
| *G05D 1/00* | (2006.01) |
| *G08G 5/04* | (2006.01) |
| *B64C 39/02* | (2006.01) |
| *G05D 1/10* | (2006.01) |

(52) U.S. Cl.
CPC ......... *G05D 1/0027* (2013.01); *B64C 39/024* (2013.01); *G05D 1/104* (2013.01); *G08G 5/045* (2013.01); *B64C 2201/143* (2013.01); *B64C 2201/146* (2013.01)

(58) Field of Classification Search
CPC ...... B60W 50/04; B60W 10/04; B60W 10/18; B60W 10/20; B60W 40/04; B60W 2050/0002; B60W 2050/143; B60W 2050/146; G05D 1/0061; G05D 2201/0213; G01C 21/26; G01C 21/3629
USPC ................. 701/2; 342/450, 357.64; 714/748, 714/E11.023; 702/141
See application file for complete search history.

(56) References Cited

U.S. PATENT DOCUMENTS

| | | | | |
|---|---|---|---|---|
| 6,038,502 | A * | 3/2000 | Sudo ..................... | G01S 13/931 180/167 |
| 2010/0085236 | A1* | 4/2010 | Franceschini ......... | G01S 13/765 342/30 |
| 2011/0214030 | A1* | 9/2011 | Greenberg ............. | A61B 5/002 714/748 |
| 2014/0062781 | A1* | 3/2014 | Mathews .............. | G01S 19/246 342/357.64 |

(Continued)

*Primary Examiner* — Shardul Patel
(74) *Attorney, Agent, or Firm* — Kenealy Vaidya LLP

(57) ABSTRACT

An unmanned vehicle for use with an entity physically spaced from the unmanned vehicle, the unmanned vehicle having objective parameters corresponding to controlled parameters of the entity. The unmanned vehicle comprises a transceiver that is configured to wirelessly receive an input signal from the entity, wherein the input signal is indicative of the controlled parameters of the entity. The unmanned vehicle further comprises a Phase-Locked Loop (PLL) circuit that is configured to generate a command signal based on a phase of the input signal and a phase of a reference signal, wherein the reference signal is indicative of the objective parameters of the unmanned vehicle. The transceiver is further configured to wirelessly transmit the command signal to the entity such that the entity controls the controlled parameters of the entity based on the command signal.

17 Claims, 7 Drawing Sheets

(56) References Cited

U.S. PATENT DOCUMENTS

2014/0136095 A1* 5/2014 Isogai .................. G01S 15/931
    701/300
2016/0033649 A1* 2/2016 Mathews ................ G01S 5/021
    342/357.48

* cited by examiner

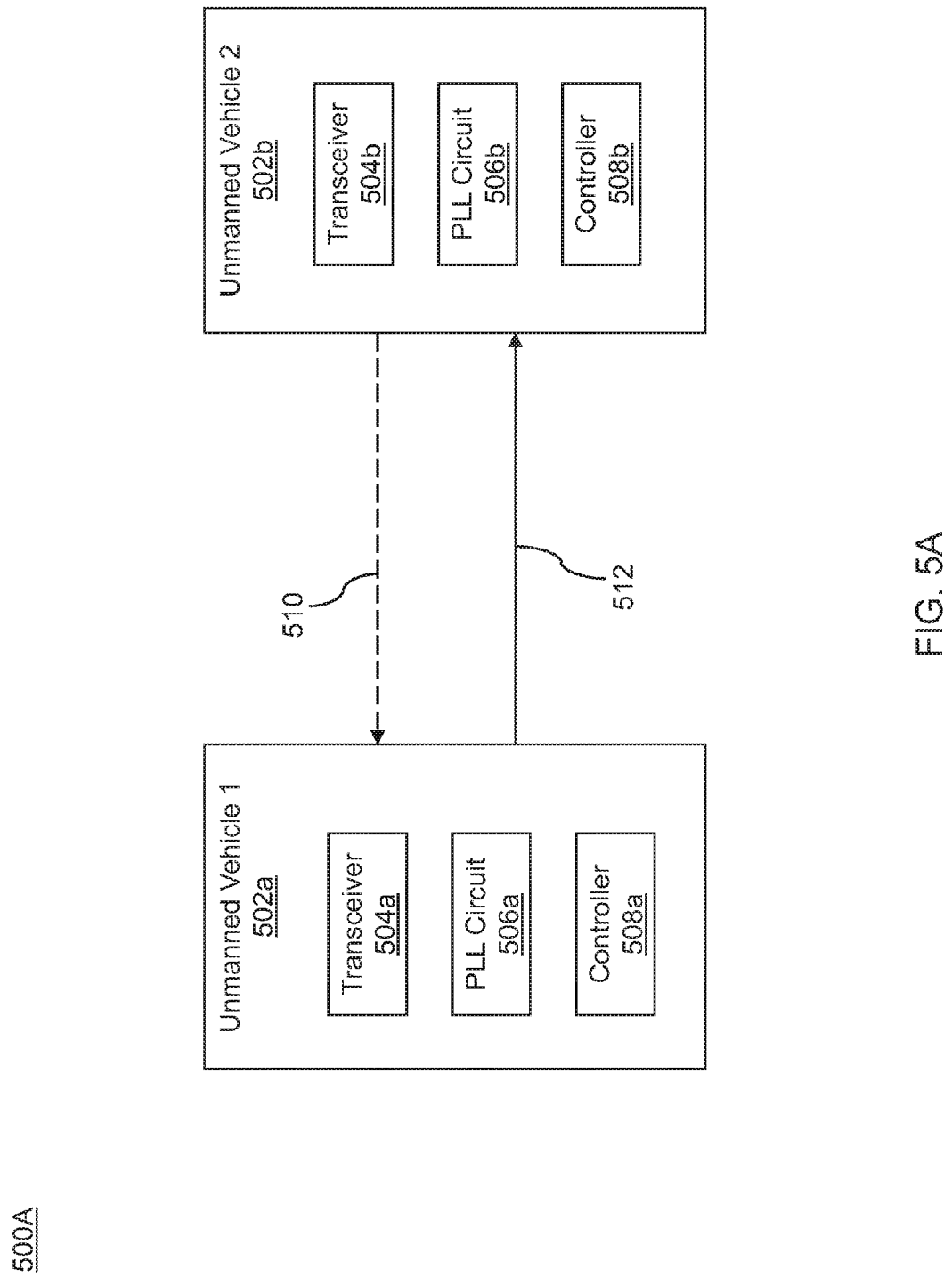

UNMANNED VEHICLES, SYSTEMS, APPARATUS AND METHODS FOR CONTROLLING UNMANNED VEHICLES

PRIORITY INFORMATION

This application claims priority to provisional Application 62/291,344 filed on Feb. 4, 2016. The substance of Application 62/291,344 is hereby incorporated in its entirety into this application.

BACKGROUND

The disclosed subject matter relates to unmanned vehicles or optionally manned vehicles, systems and methods for controlling unmanned vehicles, or optionally manned vehicles. More particularly, the disclosed subject matter relates to systems, methods and apparatus for coordinating between the unmanned vehicles, or optionally manned vehicles, and methods and apparatus for coordinating activities of the unmanned vehicles, or optionally manned vehicles.

An unmanned vehicle is a vehicle without a person on board, which is capable of sensing its surrounding and navigating on its own. The unmanned vehicle can operate in, such as, but not restricted to, air, water, land, and so forth. The unmanned vehicle can either be autonomous or remotely operated by an operator. Further, an optionally manned vehicle can be operated with or without a person on board. The optionally manned vehicle can enable manual operations in some cases, if necessary, during an unmanned operation mode of the optionally manned vehicle.

Generally, multiple unmanned vehicles (hereinafter referred to as "swarm of unmanned vehicles") are deployed in order to perform and/or coordinate the execution of various objectives. However, each unmanned vehicle of the swarm of the unmanned vehicles is vulnerable to collision with other unmanned vehicles. In another scenario, each unmanned vehicle of the swarm of the unmanned vehicles is vulnerable to collision with obstacles present in its operational environment.

SUMMARY

Unmanned vehicles are in jeopardy of colliding with each other and/or with obstacles present in their operational environments. In an exemplary scenario, an unmanned aerial vehicle, during its course of operation, can collide with obstacles, such as, but not restricted to, buildings, antennas, trees, and the like. Similarly, an unmanned terrestrial, aquatic, oceanic or even space vehicle can suffer similar collisions with the objects, such as, but not restricted to, rocks, water bodies, sand banks, corals, orbital debris, and so forth. Further, the collision between the unmanned vehicles and/or with the obstacles may result from lack of geographic data of the obstacles, or due to change in environmental conditions. The environmental conditions can include, but not restricted to, a change in wind pattern, rain, snow, and the like, which may cause the unmanned vehicles to unpredictably veer off-course and may lead to the aforementioned collisions.

The collision between the unmanned vehicles and/or with the obstacles may also result from technical faults within elements of the unmanned vehicles. The technical faults within the unmanned vehicle can be, but not restricted to, physical faults in elements of unmanned vehicle such as, actuators, sensors, rotors, and the like, or faults in software for controlling various elements of the unmanned vehicle and the like.

As a result of the above discussed reasons for collisions, the unmanned vehicles are not in coordination/synchronization with each other. The elements and/or functions of each of the elements of the unmanned vehicles require to be in coordination and/or synchronization with each other or with a base station in order to avoid collision. In an exemplary scenario, unmanned aerial vehicles may require to be in precise coordination with each other during take-off and/or landing, taxiing, docking, and the like, in order to avoid collision between the unmanned aerial vehicles.

Some related arts use navigation systems such as, but are not restricted to, a Global Positioning System (GPS), a RADAR system, and the like, in order to communicate with the other unmanned vehicles or optionally manned vehicles for coordination. Some other related arts use various techniques such as inter-element data exchange techniques and the like, in order to coordinate with the other unmanned vehicles or optionally manned vehicles. However, the navigation systems and data exchange techniques may not be available at every point of time or may be partially inaccurate. This may result in collision of the unmanned vehicle with other unmanned vehicles and/or with obstacles.

Further, some related arts require software, for example Field Programmable Gate Array (FPGA), for coordinating with other unmanned vehicles or optionally manned vehicles. However, these software works on a logic that interprets GPS data or RADAR data to make decisions as to whether an activity of an unmanned vehicle is uncoordinated, and therefore requires a correction, or an update to its status or present objective.

Further, some related arts do not use a common theory of correction for coordination in unmanned vehicles. For example, each of the unmanned vehicles may have different elements that may use different coordination techniques for coordinating with the companion unmanned vehicles, and therefore may result in collision of the unmanned vehicles. Also, these related arts do not employ feedback systems for coordinating and/or synchronization between the elements of the unmanned vehicles and are often not executed wirelessly.

It may therefore be beneficial to provide an unmanned vehicle or an optionally manned vehicle, systems, and methods for controlling multiple unmanned vehicles, that address at least one of the above issues. For example, it may be beneficial to provide an unmanned vehicle for communicating with a companion unmanned vehicle to coordinate and/or synchronize its activities with the activities of the companion unmanned vehicle. It may also be beneficial to provide feedbacks to the companion unmanned vehicles to correct its parameters and/or coordinate with the unmanned vehicle or optionally manned vehicles.

It may therefore be beneficial to provide systems, methods and apparatus that address at least one of the above and/or other disadvantages. In particular, it may be beneficial to provide an unmanned vehicle or optionally manned vehicles as well as methods of coordinating with a companion unmanned vehicle or a companion optionally manned vehicle by sharing a common theory of correction.

It may be beneficial to employ feedback systems in the unmanned vehicles or optionally manned vehicles for coordinating with the companion unmanned vehicles or companion optionally manned vehicles.

Some embodiments are therefore directed to an unmanned vehicle for use with an entity physically spaced from the unmanned vehicle, the unmanned vehicle having one or more objective parameters corresponding to one or more controlled parameters of the entity. The unmanned vehicle can include a transceiver that is configured to wirelessly receive an input signal from the entity, wherein the input signal is indicative of the controlled parameters of the entity. The unmanned vehicle can also include a Phase-Locked Loop (PLL) circuit that is configured to generate a command signal based on a phase of the input signal and a phase of a reference signal, wherein the reference signal is indicative of the objective parameters of the unmanned vehicle, wherein the transceiver is further configured to wirelessly transmit the command signal to the entity, and wherein the entity is configured to control the controlled parameters of the entity based on the command signal.

Some other embodiments are directed to a system comprising a first unmanned vehicle and a second unmanned vehicle physically spaced from each other, a first unmanned vehicle having one or more objective parameters corresponding to one or more controlled parameters of the second unmanned vehicle. The first unmanned vehicle can include a transceiver that is configured to receive an input signal from the second unmanned vehicle; wherein the input signal is indicative of the controlled parameters of the second unmanned vehicle. The first unmanned vehicle can also include a Phase-Locked Loop (PLL) circuit that is configured to generate a command signal based on a phase of the input signal and a phase of a reference signal, wherein the reference signal is indicative of the objective parameters of the first unmanned vehicle, wherein the transceiver is further configured to wirelessly transmit the command signal to the second unmanned vehicle; and wherein a controller of the second unmanned vehicle is configured to control the controlled parameters corresponding to the objective parameters based on the command signal received from the first unmanned vehicle.

Yet other embodiments are directed to a method for use with an unmanned vehicle physically spaced from an entity, the unmanned vehicle having one or more objective parameters corresponding to one or more controlled parameters of the entity. The method can include: receiving, by a transceiver of the unmanned vehicle, an input signal from the entity, wherein the input signal is indicative of the controlled parameters of the entity; generating, by a Phase-Locked Loop (PLL) circuit of the unmanned vehicle, a command signal based on a phase of the input signal and a phase of a reference signal, wherein the reference signal is indicative of the objective parameters of the unmanned vehicle; and transmitting, by the transceiver of the unmanned vehicle, the command signal to the entity, wherein the entity controls the controlled parameters of the entity based on the command signal.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5A is an exemplary environment illustrating coordination between an entity and an unmanned vehicle in accordance with the disclosed subject matter.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Unmanned Vehicle

Figure 1:
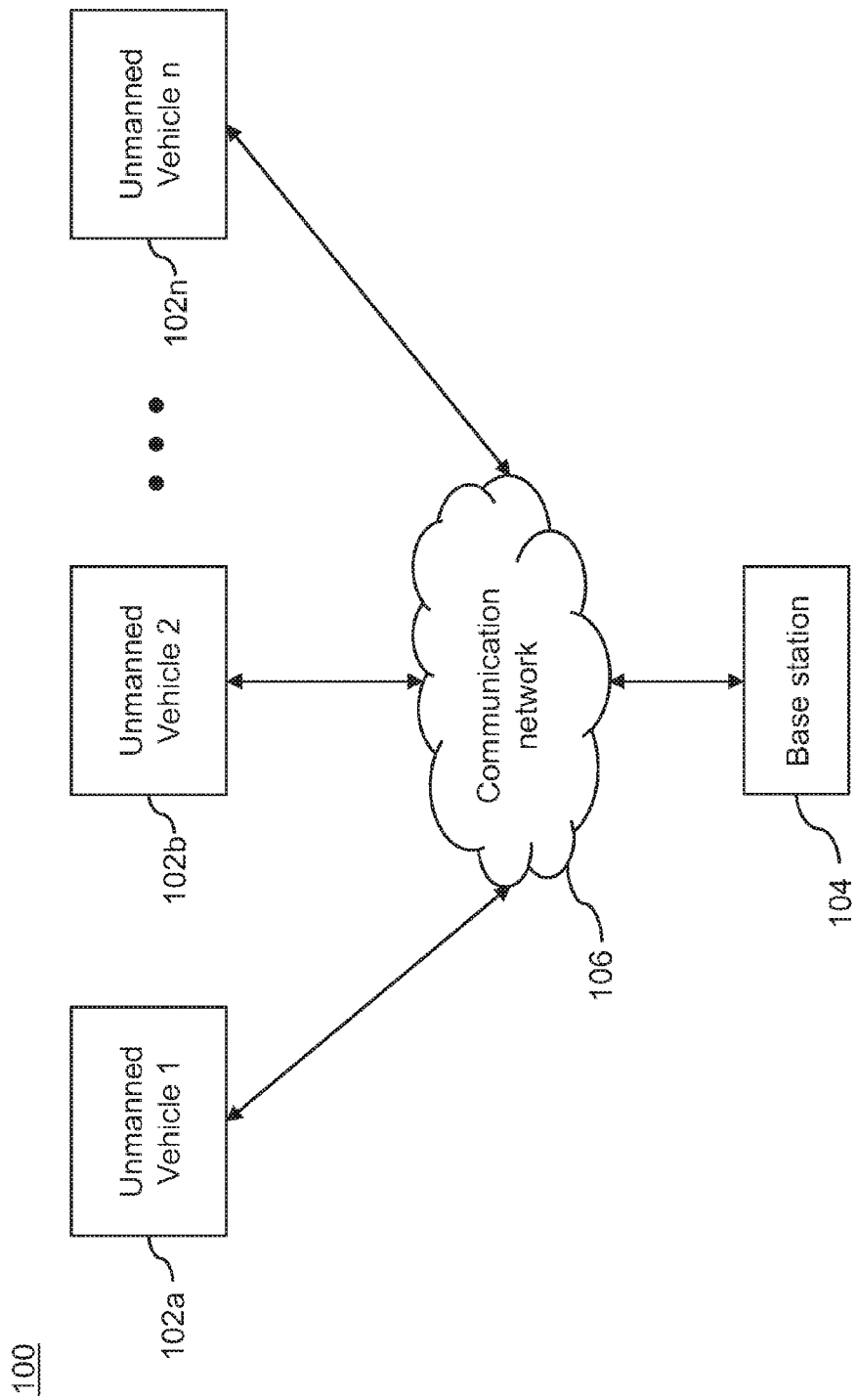
FIG. 1 is an exemplary system for coordinating unmanned vehicles in a swarm of unmanned vehicles in accordance with the disclosed subject matter.

FIG. 1 is an exemplary system 100 for coordinating between multiple unmanned vehicles (hereinafter referred to as a swarm of unmanned vehicles) or optionally manned vehicles, in accordance with the disclosed subject matter.

FIG. 1 illustrates the system 100 that includes unmanned vehicles 102*a-n*, hereinafter referred to as an unmanned vehicle 102 and collectively referred to as unmanned vehicles 102. The unmanned vehicle 102 illustrated in FIG. 1 is an exemplary scenario, and embodiments are intended to include or otherwise cover any type of unmanned vehicle, including, but not restricted to, an unmanned aerial vehicle, an unmanned terrestrial vehicle, an unmanned aquatic/oceanic vehicle, an unmanned space vehicle, a drone, a gyrocopter, etc. In fact, embodiments are intended to include or otherwise cover any type of unmanned vehicle or optionally manned vehicles that may stay geostationary in the sky and/or water bodies and also fly at a considerable height. The unmanned vehicle 102 (interchangeably referred to as an unmanned aerial vehicle 102) is merely provided for exemplary purposes, and the various inventive aspects are intended to be applied to any type of unmanned vehicle or optionally manned vehicles.

In some embodiments, the unmanned vehicle 102 can be manually controlled by an operator present at a base station 104. In some other embodiments, the unmanned vehicle 102 may be autonomously controlled based on a predetermined control strategy. In yet other embodiments, the unmanned vehicle 102 may be semi-autonomously controlled that may enable an operator to select attributes and subsequent autonomous control of the unmanned vehicles 102 based on the selected attributes.

In some embodiments, the unmanned vehicle 102 can be manually controlled by an operator at the base station 104 by using predetermined control algorithms. The control of the unmanned vehicle 102 may be a combination of operator control at a fixed base station, autonomous control, or various stages in between. The disclosed subject matter includes any or all embodiments in related art in the context of control strategy of the unmanned vehicle 102. In fact, embodiments are intended to include or otherwise cover any type of techniques, including known, related art, and/or later developed technologies to control the unmanned vehicles 102 or optionally manned vehicles.

The unmanned vehicles 102 may be deployed in any formation, such as, but not restricted to, a V-formation, and the like. The V-formation of the unmanned vehicles 102 or optionally manned vehicles may improve fuel/energy efficiency and increase flight range of the unmanned vehicles 102 or optionally manned vehicles. In an exemplary scenario, a swarm of unmanned vehicles may be deployed in a quarterback strategy for monitoring a target (not shown), such as a cell tower. However, embodiments are intended to include or otherwise cover any type of formation of unmanned vehicles or optionally manned vehicles. In fact, embodiments are intended to include or otherwise cover any formation of unmanned vehicles or optionally manned vehicles that may be beneficial to impede collision between the unmanned vehicles or optionally manned vehicles.

For operating purposes, the unmanned vehicle 102 and its components (not shown) can be powered by a power source to provide propulsion. The power source can be, but is not restricted to, a battery, a fuel cell, a photovoltaic cell, a combustion engine, fossil fuel, solar energy, an electrical power source, and so forth. In fact, embodiments are intended to include or otherwise cover any type of power source to provide power to the unmanned vehicle 102 for its operations. In fact, embodiments are intended to include or otherwise cover any type of power sources, including known, related art, and/or later developed technologies to provide propulsion to the unmanned vehicles 102.

In some embodiments, the unmanned vehicle 102 can have flight management protocols such as, but are not restricted to, rotors, propellers, and flight control surfaces that control movements and/or orientation of the unmanned vehicle 102, and the like. In alternate embodiments, the unmanned vehicle 102 can be operated by using a microcontroller. In fact, embodiments are intended to include or otherwise cover any other element that may be beneficial to communicate and/or coordinate with companion unmanned vehicles. As shown in the FIG. 1, each of the unmanned vehicle 102 in the system 100 may be a companion unmanned vehicle of the other unmanned vehicles 102.

Further, in some embodiments, the unmanned vehicle 102 can also include, but is not restricted to, a processor (not shown), a memory (not shown), and the like. In some embodiments, the processor of the unmanned vehicle 102 can be a single core processor. In alternate embodiments, the processor can be a multi-core processor. Embodiments are intended to include or otherwise cover any type of processor, including known, related art, and/or later developed technologies to enhance capabilities of processing data and/or instructions. The memory can be used to store instructions that can be processed by the processor. Embodiments are intended to include or otherwise cover any type of memory, including known, related art, and/or later developed technologies to enhance capabilities of storing data and/or instructions.

Further, the functioning of the unmanned vehicle 102 is described in more detail below in conjunction with FIG. 2.

As discussed, in some embodiments, the unmanned vehicle 102 may communicate with the base station 104. The base station 104 can be a fixed base station or a mobile base station. In some other embodiments, the mobile base station may include, but is not restricted to, an unmanned aerial vehicle, an unmanned terrestrial vehicle, a secondary swarm of unmanned vehicles, a satellite, and the like. It may also be contemplated that the base station may be, but is not restricted to, an electronic device, such as a smartphone, a laptop, a remote control device, and the like. In fact, embodiments are intended to include or otherwise cover any type of base station, including known, related art, and/or later developed technologies to communicate and/or coordinate with unmanned vehicles 102.

In some embodiments, the unmanned vehicle 102 can communicate with the base station 104 through a communication network 106. In certain embodiments, the communication network 106 can include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In some embodiments, the communication network 106 may include or otherwise cover networks or subnetworks, each of which may include, for example, a wireless data pathway. The communication network 106 may include a circuit-switched voice network, a packet-switched data network, or any other network capable for carrying electronic communications. For example, the network may include networks based on the Internet protocol (IP) or Asynchronous Transfer Mode (ATM), and may support voice usage, for example, VoIP, Voice-over-ATM, or other comparable protocols used for voice data communications. In one implementation, the network includes a cellular telephone network configured to enable exchange of text or SMS messages.

Examples of the communication network 106 may include, but are not limited to, a Personal Area Network (PAN), a Storage Area Network (SAN), a Home Area Network (HAN), a Campus Area Network (CAN), a Virtual Private Network (VPN), an Enterprise Private Network (EPN), Internet, a Global Area Network (GAN), and so forth. Embodiments are intended to include or otherwise cover any type of communication network, including known, related art, and/or later developed technologies to communicate with the base station 104 or companion unmanned vehicles.

According to some embodiments of the disclosed subject matter, the system 100 including the swarm of the unmanned vehicles 102 that may execute one or more activities in a coordinated manner. In some embodiments, the activities can include, but not restricted to, move in a same direction, flash lights at same time, drop missiles at a target at same time, move at a predefined distance from companion unmanned vehicles, move based on predefined parameters, and the like. The activities are merely provided for exemplary purposes, and embodiments are intended to include or otherwise cover any other activities of the unmanned vehicles that may be beneficial to execute in a coordinated manner so as to avoid collisions between the unmanned vehicles 102 or optionally manned vehicles. In fact, embodiments are intended to include or otherwise cover any other group activities that may be beneficial to execute in a coordinated manner so as to avoid collision between the unmanned vehicles 102 or optionally manned vehicles.

In some embodiments, the unmanned vehicle 102 may have predefined parameters for their movement. The predefined parameters may include, but not restricted to, a speed, a velocity, a position, an energy consumption, a starting point, a destination point, an altitude, an orientation, a longitude, a latitude, a heading, and the like. In fact, embodiments are intended to include or otherwise cover any predefined parameter that may be beneficial for the movement of the unmanned vehicles 102 or optionally manned vehicles. In some embodiments, the predefined parameters of the each of the unmanned vehicles 102 are stored in the memory (not shown) of the unmanned vehicle 102. In some embodiments, the predefined parameters of each of the unmanned vehicles 102 may be stored as instructions in the memory (not shown) of a single unmanned vehicle 102.

The unmanned vehicle 102 may receive an input signal from a companion unmanned vehicle. In some embodiments, the input signal received from the companion unmanned vehicle may be, but not restricted to, a ranging tone signal, a clock signal, terrain data, and the like. Ranging tones are long sequences of bits that are generated by Linear Feedback Shift Registers (LFSR's). The ranging tones are pseudo-random, and resemble white noise pattern. Further, the ranging tones are cyclical, and are based on the connections and initial values of the LFSR's. A random nature of the ranging tones keeps them from interfering in any appreciable way with local wireless traffic. However, by knowing the cyclic code, identification of a code transmitted to a companion unmanned vehicle 102 which relays the code signal back, is possible. Even though the sequence of bits received from the companion unmanned vehicle 102 appear random, the chances of the code being actual noise are almost negligible because of the precise cyclical nature of the code. In an exemplary scenario, a code transmitted by the unmanned vehicle 102 to a companion unmanned vehicle is 1,2,3,4,1,2,3,4. When the same code 1,2,3,4,1,2,3,4, is received by the unmanned vehicle 102, then it is known that the code has resulted from the transmission of the unmanned vehicle 102. Upon receiving the code, the unmanned vehicle 102 may use various parameters, such as, the speed of light, and a time required to receive the code starting from its time of transmission, in order to determine a distance travelled in the interim, i.e., distance between the unmanned vehicle 102 and the companion unmanned vehicle.

The terrain data may include, but not restricted to, a current position, a current velocity, a current energy consumption, a current speed and the like of the unmanned vehicle 102. In an exemplary scenario, a clock synchronization input signal received from an unmanned vehicle is used to enhance resolution of incoming GPS signals. However, the input signals are merely provided for exemplary purposes, and embodiments are intended to include or otherwise cover any other input signals of the unmanned vehicles that may be beneficial to provide current data associated with an unmanned vehicle so as to avoid collisions between the unmanned vehicles or optionally manned vehicles. In fact, embodiments are intended to include or otherwise cover any other input signals that may be beneficial to provide current data associated with unmanned vehicle so as to avoid collision between the unmanned vehicles 102 or optionally manned vehicles.

Further, the unmanned vehicle 102 may use the altitudes of the unmanned vehicles 102 and the companion unmanned vehicle, and the time taken by a ranging tone to reach the unmanned vehicle 102, in order to determine a relative distance between the unmanned vehicle 102 and the companion unmanned vehicle. In another exemplary scenario, if it takes 100 milliseconds (ms) for a companion unmanned vehicle to relay a signal to an unmanned vehicle 102, then the companion unmanned vehicle may be forced to delay transmission by 200 ms, knowing that the relay/processing time can be definitely finished within 200 ms. If this is known to the unmanned vehicle 102, the unmanned vehicle 102 may deduct 200 ms from the total path time to obtain a net time (total time—200 ms) required for the signal to travel to and from the companion unmanned vehicle. Further, the signal took half of that the net time (as a round trip is two ways), i.e., (total time−200 ms)/2, to reach the companion unmanned vehicle. Therefore, a distance between the unmanned vehicle 102 and the companion unmanned vehicle can be computed based on half of the net time and the speed of light.

In some embodiments, the unmanned vehicle 102 may receive the input signal from the companion unmanned vehicles at periodic intervals. The periodic interval may be, but not restricted to, one minute, four minutes, an hour, and the like. In an exemplary scenario, an unmanned vehicle may receive an input signal from a companion unmanned vehicle A after every five minutes. However, the periodic interval is merely provided for exemplary purposes, and embodiments are intended to include or otherwise cover any other periodic interval for receiving input signals from the unmanned vehicles that may be beneficial. In fact, embodiments are intended to include or otherwise cover any other periodic interval for receiving input signals from the unmanned vehicles that may be beneficial.

In some embodiments, the unmanned vehicle 102 may wirelessly receive the input signals from companion unmanned vehicles or optionally manned vehicles. In fact, embodiments are intended to include or otherwise cover any system and/or techniques for wirelessly receiving input signals from the unmanned vehicles that may be beneficial.

In some embodiments, the unmanned vehicle 102 may determine whether the input signal is received from the companion unmanned vehicle, or the base station 104. In some alternate embodiments, the unmanned vehicle 102 may determine whether the input signal is received from an obstacle. The obstacle may be, but not restricted to, a cell phone tower, a building, a satellite, and the like. In fact, embodiments of the disclosed subject matter are intended to include or otherwise cover any obstacle other than the unmanned vehicles or optionally manned vehicles.

In some embodiments, the unmanned vehicle 102 may compare the input signal received from the companion unmanned vehicle with a reference signal. The reference signal may indicate objective parameters of the unmanned vehicle 102. The objective parameters may include, but not restricted to, the predefined parameters of each of the unmanned vehicles 102. As discussed, the predefined parameters may be, but is not restricted to, a speed, a velocity, a position, an energy consumption, a starting point, a destination point, an altitude, an orientation, a longitude, a latitude, a heading, and the like. In some embodiments, the unmanned vehicle 102 may compare a phase of the input signal with a phase of the reference signal. In alternate embodiments, the unmanned vehicle 102 may compare a frequency of the input signal with a frequency of the reference signal.

Further, in some embodiments, the unmanned vehicle 102 may generate a command signal based on the comparison between the phase of the input signal with the phase of the reference signal. In some embodiments, the command signal is indicative of a desired position of the companion unmanned vehicle. The desired position may include, but not restricted to, a speed, an altitude, a heading, a latitude, and a longitude. However, the desired position is merely provided for exemplary purposes, and embodiments are intended to include or otherwise cover any other data that may be beneficial to provide a desired position of the unmanned vehicle. In fact, embodiments are intended to include or otherwise cover any other any other data that may be beneficial to provide a desired position of the unmanned vehicle.

In an exemplary scenario, a command signal may indicate that a speed of the companion unmanned vehicle should be 20 miles per hour. In fact, embodiments of the disclosed subject matter are intended to include or otherwise cover any parameter that may be beneficial to indicate a desired position of the unmanned vehicle 102 or optionally manned vehicle.

Further, in some embodiments, the unmanned vehicle 102 may transmit the command signal to the companion unmanned vehicle. In some embodiments, the unmanned vehicle 102 may wirelessly transmit the command signal to the companion unmanned vehicle. In fact, embodiments are intended to include or otherwise cover any system and/or techniques for wirelessly transmitting command signals from the unmanned vehicles to the companion unmanned vehicles that may be beneficial.

The companion unmanned vehicle may then tune the phase of the input signal according to the command signal received from the unmanned vehicle 102.

In an exemplary scenario, each of the unmanned vehicle of the swarm of the unmanned vehicle 102 is required to travel at a constant speed of five miles per hour. An unmanned vehicle A transmits an input signal to a base station. The input signal received by the base station 104 indicates that speed of the unmanned vehicle A is ten miles per second. The base station 104 compares the input signal with a reference signal indicating that the speed of the unmanned vehicle A should be five miles per hour, however, the unmanned vehicle A is travelling at ten miles per hour. The base station then generates a command signal indicating a predefined speed at which the unmanned vehicle should travel. The base station 104 then transmits the command signal to the unmanned vehicle A to control the speed of the unmanned vehicle A.

II. Functioning of the Unmanned Vehicle

Figure 2:
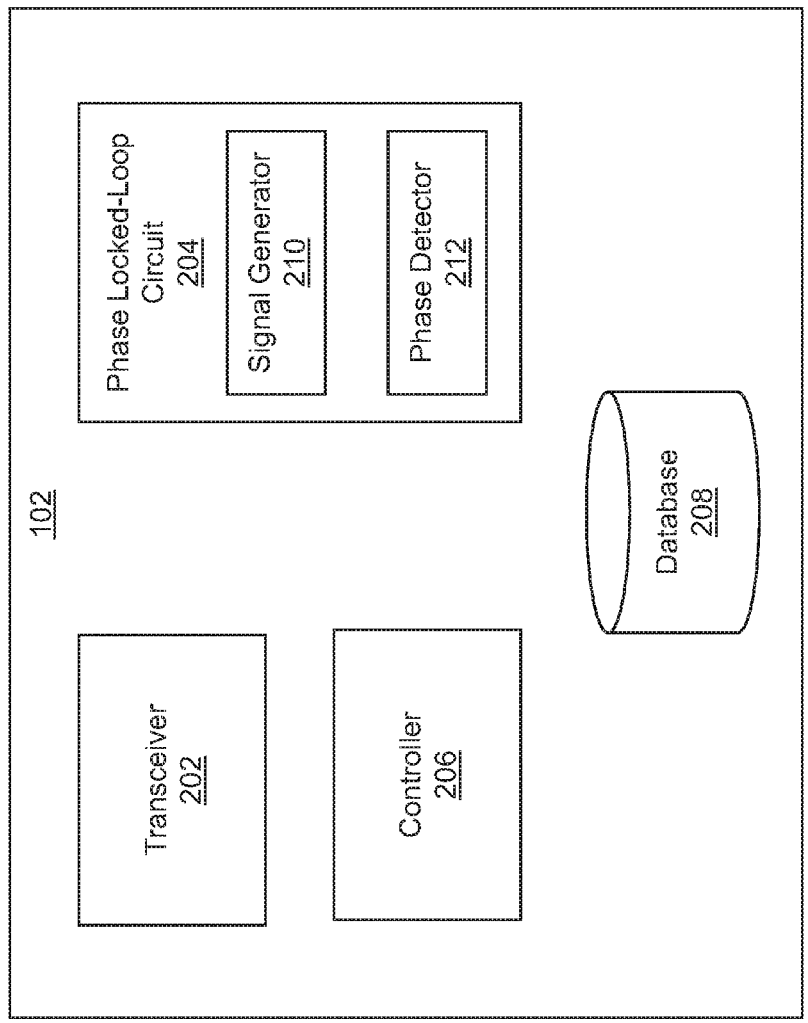
FIG. 2 illustrates components of an unmanned vehicle of the swarm of the unmanned vehicles in accordance with the disclosed subject matter.

FIG. 2 illustrates components of each of the unmanned vehicles 102, in accordance with the disclosed subject matter.

In some embodiments, the unmanned vehicle 102 can include, but is not restricted to, a transceiver 202, a Phase Locked-Loop (PLL) circuit 204, a controller 206, and a database 208. In some embodiments, the PLL circuit 204 further includes various components such as, but not restricted to, a signal generator 206, and a phase detector 212. In fact, embodiments of the disclosed subject matter are intended to include or otherwise cover any number of components in the unmanned vehicle 102 to coordinate with companion unmanned vehicles.

In some embodiments, the transceiver 202 can be configured to receive input signals from companion unmanned vehicles. The input signal may indicate controlled parameters of the companion unmanned vehicles. The controlled parameters of the companion unmanned vehicles may indicate, but not restricted to, a current speed, a current altitude, a current heading, a current latitude, and a current longitude. The values of the controlled parameters may be computed in real time. The unmanned vehicles may include a navigation unit (not shown) such as, but not restricted to, a satellite navigation unit, such as a Global Positioning System (GPS), an inertial navigation unit, and the like, in order to determine the controlled parameters of the companion unmanned vehicle in real time. In fact, embodiments of the disclosed subject matter are intended to or otherwise include any type of navigation units to determine current position of the companion unmanned vehicles.

In alternate embodiments, the unmanned vehicles 102 may include a location unit (not shown) that can be configured to determine the controlled parameters of the unmanned vehicle 102. In some embodiments, the location unit may be configured to determine the controlled parameters by various techniques, including, but not restricted to, a satellite navigation, relative vehicle telemetry, optical imaging, ranging tones, ad-hoc peer-to-peer communication between the unmanned vehicles 102, terrain data in conjunction with vehicle elevation data, an inertial navigation, and so forth. The terrain data may be obtained from various sources, such as, but not restricted to, United States Geological Survey (USGS), and the like. As discussed, the controlled parameters may include, but is not restricted to, a current latitude, a current longitude, and a current altitude. The controlled parameters can additionally include current heading and current speed. In further embodiments, the controlled parameters may include any other information that is required to determine the location of the unmanned vehicle 102.

In some embodiments, the transceiver 202 may receive the input signals from the companion unmanned vehicles at periodic intervals. The periodic interval may be, but not restricted to, two minutes, five minutes, an hour, and the like. In an exemplary scenario, an unmanned vehicle may receive an input signal from a companion unmanned vehicle X after every ten minutes.

Further, in some embodiments, the transceiver 202 may be configured to send signals back to the companion unmanned vehicles.

However, a single transceiver is merely provided for exemplary purposes, and embodiments are intended to include or otherwise cover any number of transceivers that may be beneficial. In fact, embodiments of the disclosed subject matter are intended to include or otherwise cover any number of transceivers in the unmanned vehicle 102 to wirelessly receive input signals from the companion unmanned vehicles.

In some embodiments, the PLL circuit 204 may be a wireless PLL circuit such that the PLL circuit 204 phase locks the frequency of the received input signal. In alternate embodiments, the PLL circuit 204 may be configured to generate a signal, modulate or demodulate a signal, reconstitute a signal with less noise, or multiply or divide a frequency of the input signals, and the like. In some embodiments, different PLL circuits may be used for different unmanned vehicles depending on the applications being monitored and synchronized for the unmanned vehicles. However, a single PLL circuit is merely provided for exemplary purposes, and embodiments are intended to include or otherwise cover any number of PLL circuits that may be beneficial. In fact, embodiments of the disclosed subject matter are intended to include or otherwise cover any number of PLL circuits in the unmanned vehicle 102 to determine phase deviations between the input signals and the reference signals.

In some embodiments, the PLL circuit 204 may include the signal generator 210 that may further be configured to generate a reference signal. The reference signal may indicate objective parameters of the unmanned vehicle 102. The objective parameters may be, but not restricted to, predefined parameters of the companion unmanned vehicles. In some embodiments, the predefined parameters may be stored in the database 208. The reference signal may be used to tune the phase of the input signal in order to obtain the command signal. Specifically, the phase of the input signal may be tuned to the phase of the reference signal in order to obtain the command signal. However, embodiments of the disclosed subject matter are intended to include or otherwise cover any tuning method that may be beneficial to tune the phase of the input signal may be tuned to the phase of the reference signal. In alternate embodiments, the PLL circuit 204 may include a Voltage Controlled Oscillator (VCO) for generating the reference signal.

However, a single signal generator is merely provided for exemplary purposes, and embodiments are intended to include or otherwise cover any number of signal generators that may be beneficial. In fact, embodiments of the disclosed subject matter are intended to include or otherwise cover any number of signal generators in the unmanned vehicle 102 to generate reference signals for the companion unmanned vehicles.

In some embodiments, the PLL circuit 204 may further include the phase detector 212. The phase detector 212 may be configured to determine a difference between the phase of the input signal and the phase of the reference signal.

In some embodiments, the PLL circuit 204 may further be configured to generate a command signal based on the comparison of the phase difference between the input signal and the reference signal. The command signal is indicative of a desired position of the companion unmanned vehicle such that the companion unmanned vehicle moves to the desired position. In some embodiments, the command signal may include, but not restricted to, a speed, an altitude, a heading, a latitude, a longitude, and the like. However, a single phase detector is merely provided for exemplary purposes, and embodiments are intended to include or otherwise cover any number of phase detector that may be beneficial. In fact, embodiments of the disclosed subject matter are intended to include or otherwise cover any number of phase detectors in the unmanned vehicle 102 to determine phase deviations between the input signals and the reference signals.

Further, the transceiver 202 may be configured to wirelessly transmit the command signal to the companion unmanned vehicle. The transceiver 202 can use communication techniques that may include radio communications based on any frequency spectrum (e.g., Very High Frequency (VHF) or Ultra-High Frequency (UHF)) and any supporting infrastructure (e.g., satellites, cell phone towers, etc.). In fact, embodiments of the disclosed subject matter are intended to include or otherwise cover any type of techniques, including known, related art, and/or later developed technologies to transmit the command signals to the companion unmanned vehicle through a communication network such as the communication network 106.

In some embodiments, the controller 206 may be configured to control the controlled parameters based on the received command signal. The controller 206 may control various operations of the unmanned vehicle 102 including, but not limited to, a movement of the unmanned vehicle 102, controlling and coordinating operations of various components of the unmanned vehicle 102, controlling and coordinating operations of various unmanned vehicles, interfacing with other unmanned vehicles 102 and processing information from the base station 104. In fact, embodiments of the disclosed subject matter are intended to include or otherwise cover any type of controller, including known, related art, and/or later developed technologies to control the unmanned vehicles 102. In an exemplary scenario, if a desired speed of the companion unmanned vehicle is 15 miles per hour, and the companion unmanned vehicle is moving at 10 miles per hour, then the controller of the companion unmanned vehicle can increase the speed of the companion unmanned vehicle from 10 miles per hour to 15 miles per hour.

In alternate embodiments, the controller 206 of the unmanned vehicle 102 may be configured to determine whether the input signal is received from a companion unmanned vehicle, or a base station such as the base station 104, or an obstacle. In some cases, the input signal may be received from an obstacle, and the controller 206 may ignore the input signal. In alternate embodiments, the controller 206 may communicate to the transceiver 202 to take necessary action, for example, to perform a jamming operation. However, a single controller is merely provided for exemplary purposes, and embodiments are intended to include or otherwise cover any number of controllers that may be beneficial to control the controlled parameters of the companion unmanned vehicles. In fact, embodiments of the disclosed subject matter are intended to include or otherwise cover any number of controllers that may be beneficial to control the controlled parameters of the companion unmanned vehicles.

III. Operation of the Unmanned Vehicle

Figure 3:
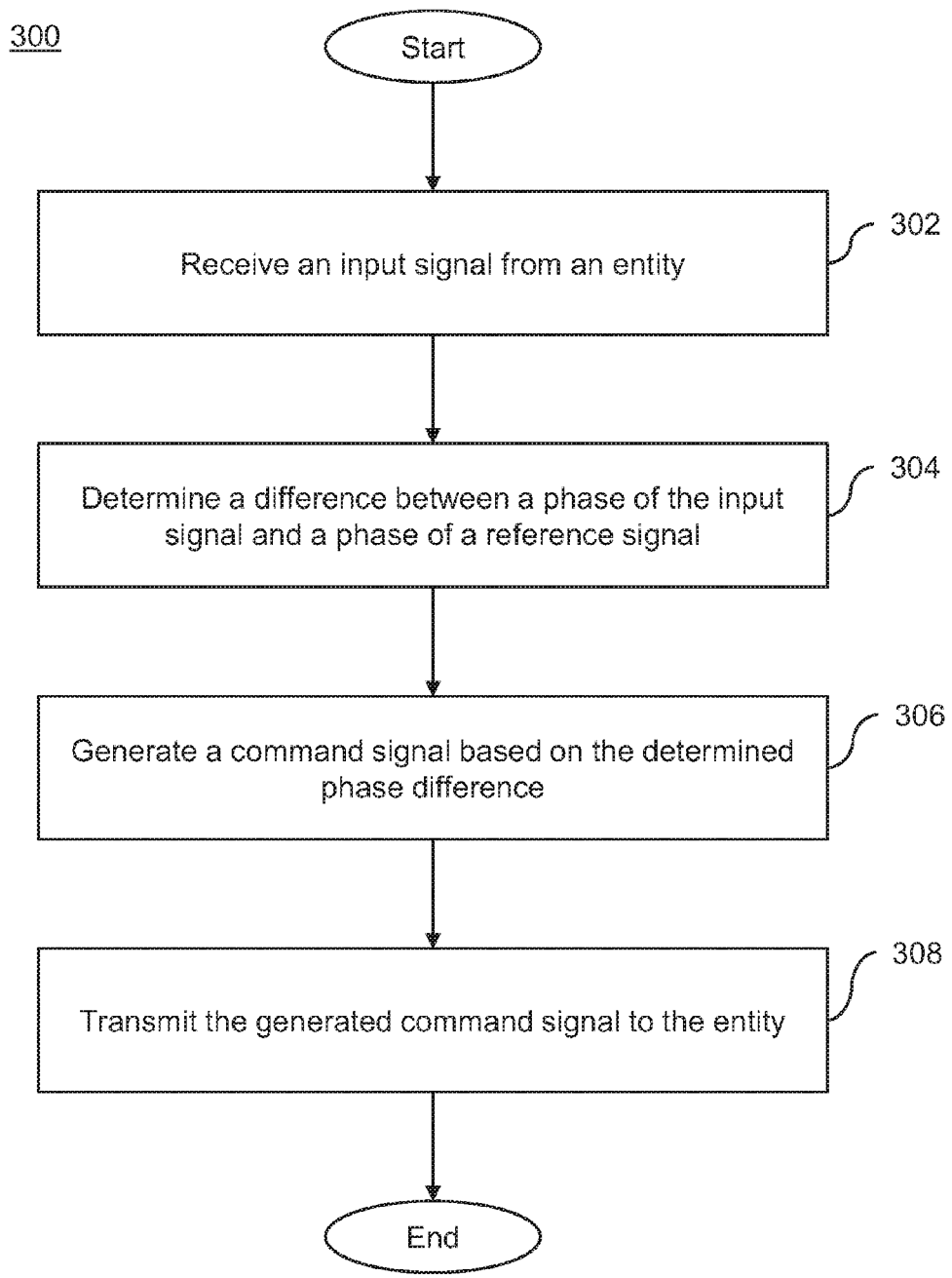
FIG. 3 is a method for coordinating between an entity and an unmanned vehicle in accordance with the disclosed subject matter.

FIG. 3 is a flowchart of a procedure 300 for coordinating between an unmanned vehicle and an entity in accordance with the disclosed subject matter. In some embodiments, the entity can be a companion unmanned vehicle. This flowchart is merely provided for exemplary purposes, and embodiments are intended to include or otherwise cover any methods or procedures for coordinating a companion unmanned vehicle with an unmanned vehicle.

In accordance with the flowchart of FIG. 3, the unmanned vehicle 102 receives an input signal from an entity via the transceiver 202. In some embodiments, the input signal can include, but is not restricted to, controlled parameters of the entity. The controlled parameters may indicate a current position, a current location, a current heading, a current speed, and the like of the entity.

At step 304, the unmanned vehicle 102 determines a difference between a phase of the input signal and a phase of a reference signal via the phase detector 212. In some embodiments, the reference signal may be generated by a signal generator of the unmanned vehicle 102. The reference signal may indicate objective parameters of the unmanned vehicle 102.

Next, at step 306, the unmanned vehicle 102 generates a command signal based on the determined phase difference between the input signal and the reference signal via the PLL circuit 204. As discussed above, the command signal may be indicative of a desired parameters of the companion unmanned vehicle. In an embodiment, the desired parameters may be indicative of a desired position such that the companion unmanned vehicle moves to the desired position. In some embodiments, the command signal may include, but not restricted to, a speed, an altitude, a heading, a latitude, a longitude, and the like.

Thereafter, at step 308, the unmanned vehicle 102 transmits the command signal to the entity. This results in a phase locked loop between the unmanned vehicle 102 and the entity, the phase locked loop providing a feedback to the entity to correct the parameters of the input signal to the desired parameters based on the command signal.

Figure 4:
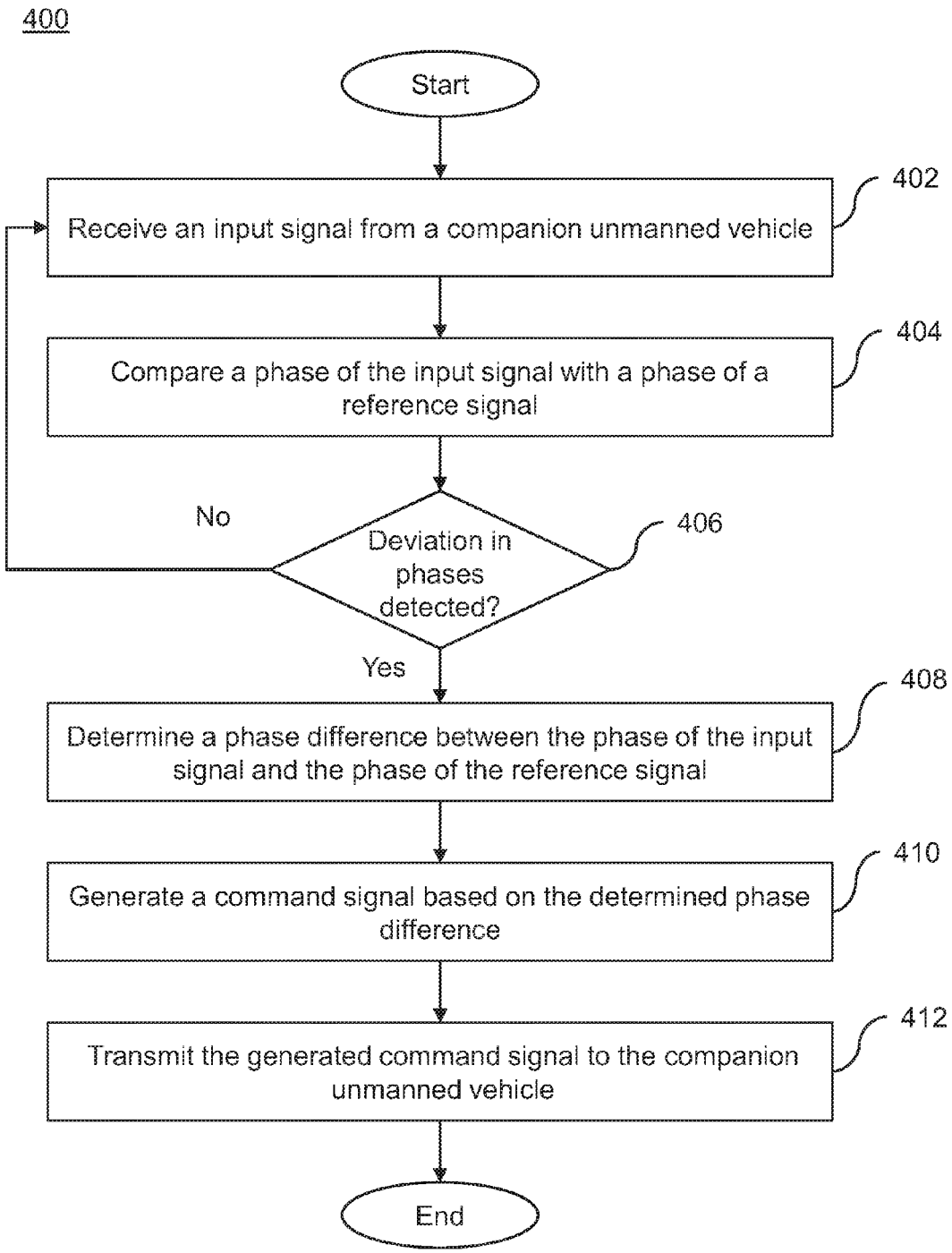
FIG. 4 is a method for coordinating between an unmanned vehicle and a base station in accordance with the disclosed subject matter.

FIG. 4 is a flowchart of a procedure 400 for coordinating between an unmanned vehicle and a base station in accordance with the disclosed subject matter. This flowchart is merely provided for exemplary purposes, and embodiments are intended to include or otherwise cover any methods or procedures for coordinating an unmanned vehicle with one or more companion unmanned vehicles.

In accordance with the flowchart of FIG. 4, at step 402, the transceiver 202 of the base station 104 receives an input signal from an unmanned vehicle. In some embodiments, the input signal can include, but is not restricted to, controlled parameters of the unmanned vehicle. The controlled parameters may indicate a current position, a current location, a current heading, a current speed, and the like of the companion unmanned vehicle.

At step 404, the PLL circuit 204 of the base station 104 compares a phase of the input signal with a phase of a reference signal. In some embodiments, the reference signal may be generated by a signal generator of the base station 104. The reference signal may indicate objective parameters of the base station 104.

Next, at step 406, the PLL circuit 204 of the base station 104 determines whether a deviation in phases is detected. In case, a deviation between the phase of the input signal and the phase of the reference signal is detected, the procedure 400 proceeds towards step 408. In case, a deviation between the phase of the input signal and the phase of the reference signal is not detected, the procedure 400 returns to step 402 and continues receiving input signals from the unmanned vehicle.

At step 408, the PLL circuit 204 of the base station 104 determines a difference between the phase of the input signal and the phase of the reference signal.

Next, at step 410, the PLL circuit 204 of the base station 104 generates a command signal based on the determined phase difference between the input signal and the reference signal. As discussed, the command signal is indicative of a desired parameter of the unmanned vehicle. In an embodiment, the desired parameter may be indicative of a desired position such that the unmanned vehicle moves to the desired position. In some embodiments, the command signal may include, but not restricted to, a speed, an altitude, a heading, a latitude, a longitude, and the like.

Thereafter, at step 412, the transceiver 202 of the base station 104 wirelessly transmits the command signal to the unmanned vehicle. This results in a phase locked loop between the unmanned vehicle 102 and the base station 104. The phase locked loop provides a feedback to the unmanned vehicle to correct the parameters of the input signal to the desired parameters based on the command signal.

Further, the controller of the unmanned vehicle controls the controlled parameters based on the command signal received from the base station 104.

IV. Exemplary Embodiments of the Unmanned Vehicle

FIG. 5A illustrates an exemplary scenario, in which an unmanned vehicle 502a coordinates with an unmanned vehicle 502b. The unmanned vehicle 502a wirelessly receives an input signal 510 from the unmanned vehicle 502b. As shown, a transceiver 504a of the unmanned vehicle 502a receives the input signal 510 transmitted from a transceiver 504b of the unmanned vehicle 502b. The input signal 510 indicates controlled parameters of the unmanned vehicle 502b such that the controlled parameters indicate an exemplary current velocity 'five meters per second east' of the unmanned vehicle 502b. Further, a PLL circuit 506a of the unmanned vehicle 502a processes the received input signal 510. The processing of the signal includes comparing a phase of the input signal 510 with a phase of a reference signal. The reference signal may indicate that the velocity of the unmanned vehicle 502b should be 10 meters per second east. The PLL circuit 506a of the unmanned vehicle 502a then generates a command signal 512 based on the comparison between the phase of the unmanned vehicle 502b and the phase of the reference signal. The command signal 512 indicates a desired velocity such that the unmanned vehicle 502b moves with the desired velocity. The PLL circuit 506a of the unmanned vehicle 502a generates a phase locked loop by receiving and comparing the phase of the input signal with the phase of the reference signal and then provides the command signal 512 that is fed back to the unmanned vehicle 502b.

Further, the transceiver 504a of the unmanned vehicle 502a wirelessly transmits the command signal 512 to the unmanned vehicle 502b. The transceiver 504b of the unmanned vehicle 502b receives the command signal from the unmanned vehicle 502a. Thereafter, a controller 508b of the unmanned vehicle 502b controls the controlled parameters based on the received command signal. The controller 508b increases the velocity of the unmanned vehicle 502b from five meters per second east to 10 meters per second east. Therefore, the PLL circuit 506a provides a negative feedback to the unmanned vehicle 502b to synchronize the vehicle velocity of the unmanned vehicle 502b with the vehicle velocity of the unmanned vehicle 502a.

Figure 5B:
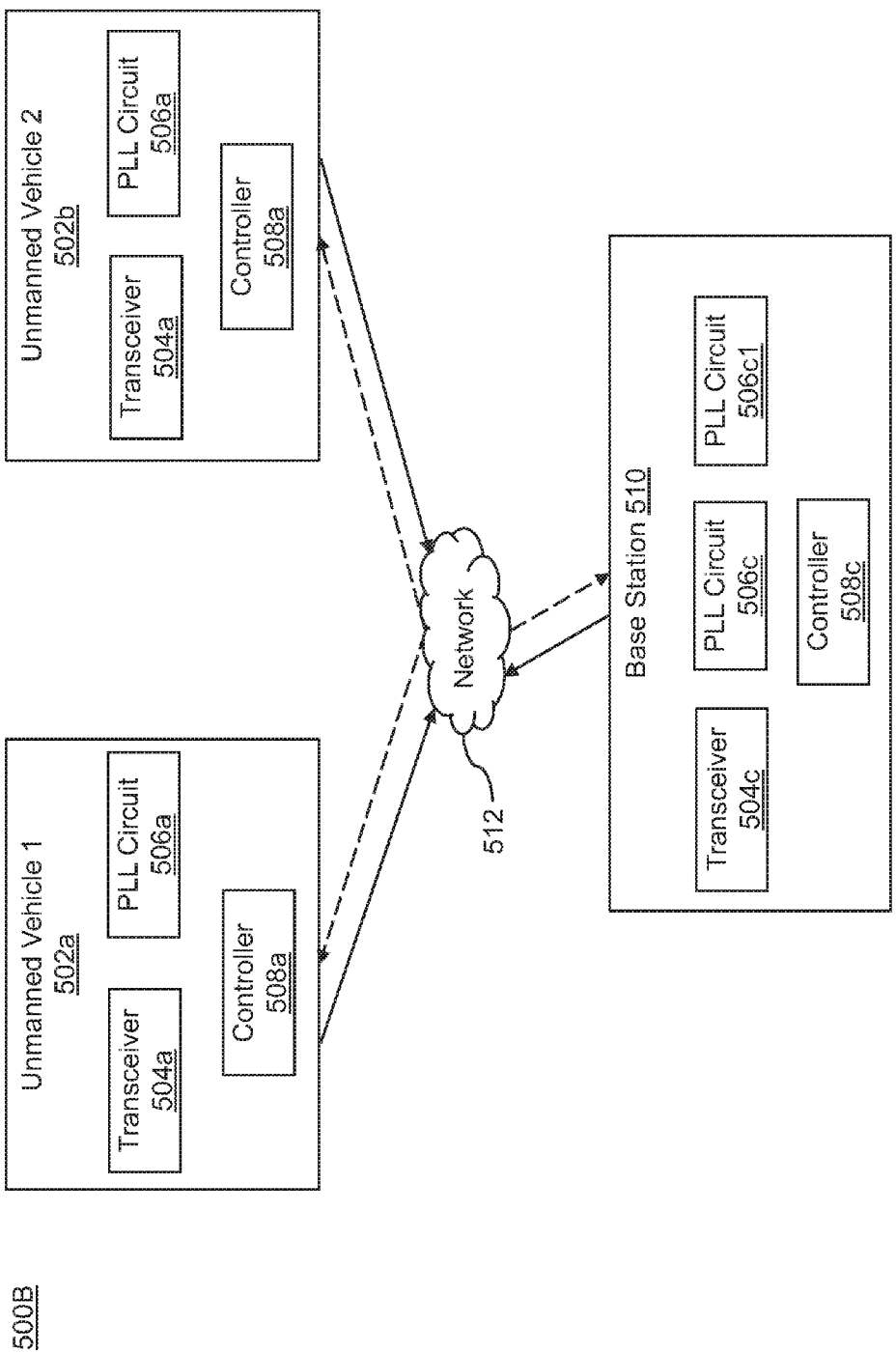
FIG. 5B is an exemplary environment illustrating coordination between unmanned vehicles and a base station in accordance with the disclosed subject matter.

FIG. 5B illustrates an exemplary scenario in which an unmanned vehicle 1 502a is in coordination with an unmanned vehicle 502b such that the coordination between the unmanned vehicles is thorough a base station 510. The unmanned vehicle 1 502a includes a transceiver 504a, the unmanned vehicle 502b includes a transceiver 504b, and the base station 510 includes a transceiver 504c. The transceiver of each of the unmanned vehicles and the base station 510 is configured to transmit and/or receive signals from each other. In addition, the unmanned vehicle 1 502a includes a PLL circuit 506a, the unmanned vehicle 502b includes a PLL circuit 506b, and the base station 510 includes two PLL circuits 506c and 506c1. The PLL circuits of each of the unmanned vehicles and the base station 510 are configured to generate command signals based on determined phase difference between the inputs signals with respect to corresponding reference signals. Further, the unmanned vehicle 1 502a includes a controller 508a, the unmanned vehicle 502b includes a controller 508b, and the base station 510 includes a controller 508c. The controller 508 of each of the unmanned vehicles and the base station 510 is configured to control the unmanned vehicles and the base station.

For operational purposes, each of the transceiver 504a and transceiver 504b of the unmanned vehicle 502a and unmanned vehicle 502b, respectively, transmits an input signal (represented as a solid transmission line) through a network such as the communication network 106 to the base station 510. The input signals may indicate heading of each of the unmanned vehicles 502a and 502b. The unmanned vehicle 502a may be heading towards north and the unmanned vehicle 502b may be heading towards north-east. The transceiver 504c of the base station 510 receives the input signals from the unmanned vehicle 502a and unmanned vehicle 502b. The transceiver 504c transmits the input signal received from the unmanned vehicle 502a to the PLL circuit 506c and similarly, transmits the input signal received from the unmanned vehicle 502b to the PLL circuit 506c1. Each of the PLL circuits 506c and 506c1 compares phases of the input signals with the phase of the corresponding reference signals that are generated by a signal generator (not shown) of each of the PLL circuits 506c and 506c1. Based on the comparison between the phases of the input signals with the phases of the corresponding reference signals, the PLL circuits 506c and 506c1 generate command signals. The command signals indicate that the unmanned vehicle is deviating from objective parameters of the unmanned vehicle. In the above exemplary scenario, the phase difference between the input signal of the unmanned vehicle 502a and the reference signal is negligible, while the phase difference between the input signal of the unmanned vehicle 502b and the reference signal is significantly large, i.e., the unmanned vehicle 508b is heading towards northeast instead of coordinating with the unmanned vehicle 502a and move in north direction. Therefore, the transceiver 504c of the base station 510 transmits the command signal to the unmanned vehicle 502b (represented via a dashed transmission line).

Further, the controller 508b of the unmanned vehicle 502b controls the movement of the unmanned vehicle 502b and direct the unmanned vehicle 502b to move towards north direction.

This process of correcting the phases of the input signal with a reference signal is repeated so that the unmanned vehicles 502a and 502b moves in a coordinated manner.

The exemplary scenario, as described above in conjunction with FIGS. 5A and 5B, are for illustrative purposes only and many alternative scenarios are possible without deviating from the scope of the disclosed subject matter. In fact, embodiments are intended to include or other cover various strategies of autonomous coordination among the unmanned vehicles 102a and 102b.

V. Other Exemplary Embodiments of the System

In some embodiments, the system 100 as shown in FIG. 1 can be used to coordinate elements of the unmanned vehicles 102. The elements may be, but not restricted to, cameras, flash lights, targeting munitions on a target, initiating power sources, and the like. In an exemplary scenario, an unmanned vehicle communicates with a base station and the base station provides a command signal to the unmanned vehicle to flash a light after every four second. In another exemplary scenario, a swarm of unmanned vehicles that has 20 unmanned vehicles is subdivided into a first swarm of unmanned vehicles and a second swarm of unmanned vehicles such that each of the subdivided swarms of unmanned vehicles includes 10 unmanned vehicles. The base station then generates a command signal that is transmitted to each unmanned vehicle of the first swarm of the unmanned vehicles to flash lights after every five seconds and to the second swarm of the unmanned vehicles to flash lights after every three seconds. During the flashing of lights, all the unmanned vehicles transmits input signals to the base station. In case a deviation in flashing of the light in any unmanned vehicle is detected, then a feedback, such as a command signal, is transmitted to the unmanned vehicle to correct the frequency at which flashing of the light takes place.

In alternate embodiments, a command signal may be used to coordinate elements of an unmanned vehicle. In an exemplary scenario, an unmanned vehicle includes four cameras. A transceiver of the unmanned vehicle transmits an input signal about the position of the cameras. A PLL circuit then generates a command signal to capture images of an object. A controller of the unmanned vehicle then controls the cameras to capture images of the object based on the command signal. Images captured by each of the cameras are then processed to create three dimensional (3D) stereoscopic images of the object. Therefore, the disclosed subject matter may also be used to coordinate elements of an unmanned vehicle.

In another exemplary scenario, an unmanned vehicle with a relatively low-power transmitter could phase lock with other companion unmanned vehicles to combine their respective low-power transmissions to form a perfectly coordinated resultant high-powered signal to communicate with base station(s) beyond the reach of any of the individually radiating elements. For example, small munitions (such as light weight, low power electric guns) deployed on multiple unmanned vehicles could be precisely coordinated to result in an overall extremely powerful strike.

VI. Computer System Associated with Unmanned Vehicles

Figure 6:
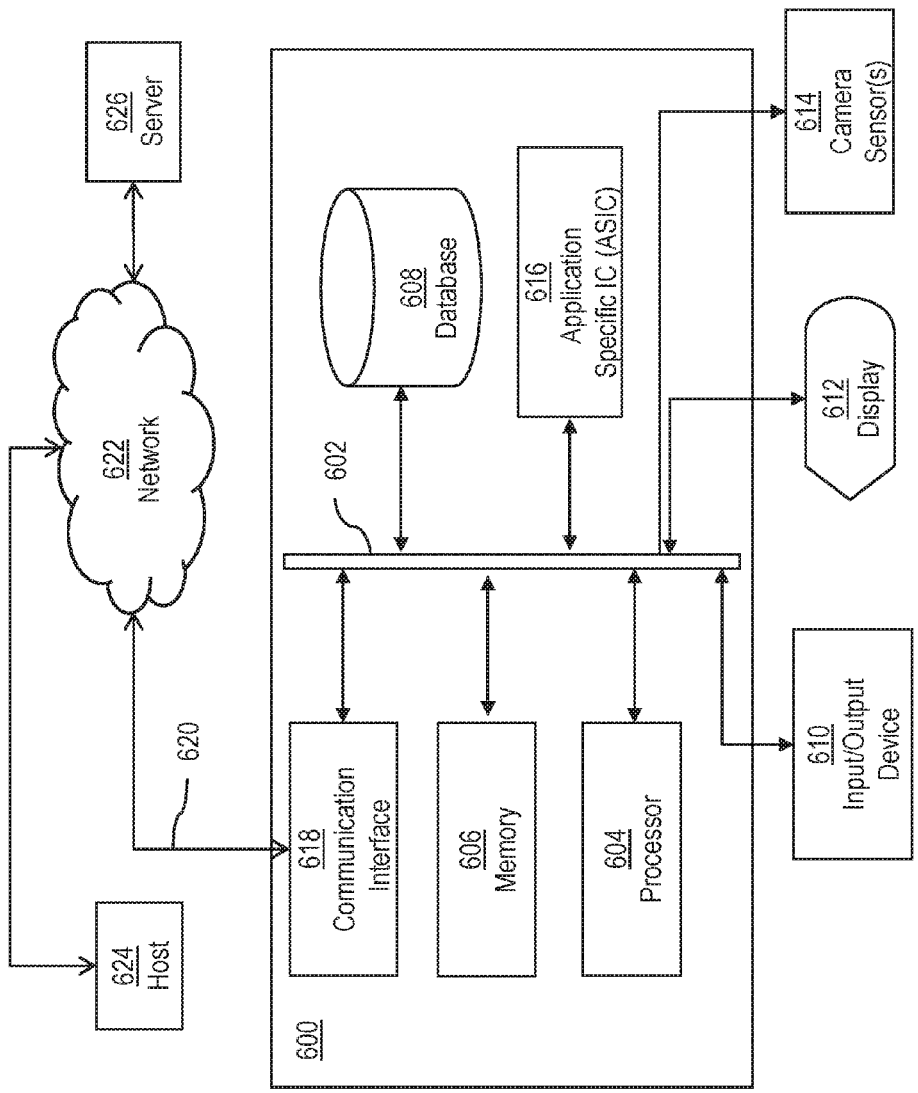
FIG. 6 is a computer system that can be used to implement various exemplary embodiments of the disclosed subject matter.

FIG. 6 illustrates a computer system 600 upon which an embodiment of the invention may be implemented. The computer system 600 may be part of the controller 206 of the unmanned vehicle 102 or the base station 104. In fact, the computer system 600 can be part of any component of the unmanned vehicle 102 and the base station 104. Although, the computer system 600 is depicted with respect to a particular device or equipment, it is contemplated that other devices or equipment (e.g., network elements, servers, etc.) within FIG. 6 can deploy the illustrated hardware and components of the system 600. The computer system 600 is programmed (e.g., via computer program code or instructions) to coordinate one or more unmanned vehicles described herein and includes a communication mechanism such as a bus 602 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 600, or a portion thereof, constitutes a means for performing one or more steps for coordinating one or more unmanned vehicles.

A bus 602 includes one or more parallel conductors of information so that information is transferred quickly among devices coupled to the bus 602. One or more processors 604 for processing information are coupled with the bus 602.

The processor (or multiple processors) 604 performs a set of operations on information as specified by computer program code related to coordinate one or more unmanned vehicles. The computer program code is a set of instructions or statements providing instructions for the operation of the processor 604 and/or the computer system 600 to perform specified functions. The code, for example, may be written in a computer programming language that is compiled into a native instruction set of the processor 604. The code may also be written directly using the native instruction set (e.g., machine language). The set of operations include bringing information in from the bus 602 and placing information on the bus 602. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 604, such as a sequence of operation codes, constitute processor instructions, also called computer system instructions or, simply, computer instructions. The processors 604 may be implemented as mechanical, electrical, magnetic, optical, chemical, or quantum components, among others, alone or in combination.

The computer system 600 also includes a memory 606 coupled to the bus 602. The memory 606, such as a Random Access Memory (RAM) or any other dynamic storage device, stores information including processor instructions for storing information and instructions to be executed by the processor 604. The dynamic memory 606 allows information stored therein to be changed by the computer system 600. RAM allows a unit of information stored at a location called a memory address to be stored and retrieved independently of information at neighboring addresses. The memory 606 is also used by the processor 604 to store temporary values during execution of processor instructions. The computer system 600 also includes a Read Only Memory (ROM) or any other static storage device coupled to the bus 602 for storing static information, including instructions, that is not changed by the computer system 600. Some memory is composed of volatile storage that loses the information stored thereon when power is lost. Also coupled to the bus 602 is a non-volatile (persistent) storage device 608, such as a magnetic disk, a solid state disk, optical disk or flash card, for storing information, including instructions, that persists even when the computer system 600 is turned off or otherwise loses power.

Information, including instructions for coordinating one or more unmanned vehicles is provided to the bus 602 for use by the processor 604 from an external input device 610, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in the computer system 600. Other external devices coupled to the bus 602, used primarily for interacting with humans, include a display 612, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and a pointing device 616, such as a mouse, a trackball, cursor direction keys, or a motion sensor, for controlling a position of a small cursor image presented on the display 612 and issuing commands associated with graphical elements presented on the display 612, and one or more camera sensors 614 for capturing, recording and causing to store one or more still and/or moving images (e.g., videos, movies, etc.) which also may comprise audio recordings. Further, the display 612 may be a touch enabled display such as capacitive or resistive screen. In some embodiments, for example, in embodiments in which the computer system 600 performs all functions automatically without human input, one or more of the external input device 610, and the display device 612 may be omitted.

In the illustrated embodiment, special purpose hardware, such as an ASIC 616, is coupled to the bus 602. The special purpose hardware is configured to perform operations not performed by the processor 604 quickly enough for special purposes. Examples of ASICs include graphics accelerator cards for generating images for the display 612, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 also includes one or more instances of a communication interface 618 coupled to the bus 602. The communication interface 618 provides a one-way or two-way communication coupling to a variety of external devices that operate with their own processors, such as printers, scanners and external disks. In general, the coupling is with a network link 620 that is connected to a local network 622 to which a variety of external devices with their own processors are connected. For example, the communication interface 618 may be a parallel port or a serial port or a Universal Serial Bus (USB) port on a personal computer. In some embodiments, the communication interface 618 is an Integrated Services Digital Network (ISDN) card, a Digital Subscriber Line (DSL) card, or a telephone modem that provides an information communication connection to a corresponding type of a telephone line. In some embodiments, the communication interface 618 is a cable modem that converts signals on the bus 602 into signals for a communication connection over a coaxial cable or into optical signals for a communication connection over a fiber optic cable. In one embodiment, wireless links may also be implemented. For wireless links, the communication interface 618 sends or receives or both sends and receives electrical, acoustic or electromagnetic signals, including infrared and optical signals that carry information streams, such as digital data. For example, in wireless handheld devices, such as mobile telephones like cell phones, the communication interface 618 includes a radio band electromagnetic transmitter and receiver called a radio transceiver. In certain embodiments, the communication interface 618 enables connection to the communication network 106 for coordinating one or more unmanned vehicles. Further, the communication interface 618 can include peripheral interface devices, such as a thunderbolt interface, a Personal Computer Memory Card International Association (PCM-CIA) interface, etc. Although a single communication interface 618 is depicted, multiple communication interfaces can also be employed.

The term "computer-readable medium" as used herein refers to any medium that participates in providing information to the processor 604, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 608. Volatile media include, for example, the dynamic memory 606. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 616.

The network link 620 typically provides information communication using transmission media through one or more networks to other devices that use or process the information. For example, the network link 620 may provide a connection through the local network 622 to a host computer 624 or to ISP equipment operated by an Internet Service Provider (ISP).

A computer called a server host 626, connected to the Internet, hosts a process that provides a service in response to information received over the Internet. For example, the server host 626 hosts a process that provides information representing video data for presentation at the display 612. It is contemplated that the components of the computer system 600 can be deployed in various configurations within other computer systems, e.g., the host 624 and the server 626.

At least some embodiments of the invention are related to the use of the computer system 600 for implementing some or all of the techniques described herein. According to one embodiment of the invention, those techniques are performed by the computer system 600 in response to the processor 604 executing one or more sequences of one or more processor instructions contained in the memory 606. Such instructions, also called computer instructions, software and program code, may be read into the memory 606 from another computer-readable medium such as the storage device 608 or the network link 620. Execution of the sequences of instructions contained in the memory 606 causes the processor 604 to perform one or more of the method steps described herein. In alternative embodiments, hardware, such as the ASIC 616, may be used in place of or in combination with software to implement the invention. Thus, embodiments of the invention are not limited to any specific combination of hardware and software, unless otherwise explicitly stated herein.

Various forms of computer readable media may be involved in carrying one or more sequence of instructions or data or both to the processor 604 for execution. For example, instructions and data may initially be carried on a magnetic disk of a remote computer such as the host 624. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 620. An infrared detector serving as the communication interface 618 receives the instructions and data carried in the infrared signal and places information representing the instructions and data onto the bus 602. The bus 602 carries the information to the memory 606 from which the processor 604 retrieves and executes the instructions using some of the data sent with the instructions. The instructions and data received in the memory 606 may optionally be stored on the storage device 608, either before or after execution by the processor 604.

VII. Alternative Embodiments

While certain embodiments of the invention are described above, and FIGS. 1-6 disclose the best mode for practicing the various inventive aspects, it should be understood that the invention can be embodied and configured in many different ways without departing from the spirit and scope of the invention.

For example, embodiments are disclosed above in the context of an unmanned vehicle. However, embodiments are intended to include or otherwise cover any type of unmanned vehicle or an optionally manned vehicle, including, but not restricted to, an unmanned or optionally manned aerial vehicle, an unmanned or optionally manned terrestrial vehicle (for example, a car), an unmanned or optionally manned aquatic vehicle, an unmanned or optionally manned railed vehicles, an unmanned or optionally manned spacecraft, a drone, a gyrocopter, and the like. In fact, embodiments are intended to include or otherwise cover any configuration of an unmanned vehicle or an optionally manned vehicle.

Embodiments are disclosed above in the context of a swarm of unmanned aerial vehicles. However, embodiments are intended to include or otherwise cover a swarm including unmanned aerial vehicles and unmanned aquatic vehicles. In fact, embodiments are intended to include or otherwise cover any type of unmanned vehicles or optionally manned vehicles in a swarm.

Exemplary embodiments are also intended to cover any additional or alternative components of the unmanned vehicle disclosed above. Exemplary embodiments are further intended to cover omission of any component of the unmanned vehicle disclosed above.

Embodiments are disclosed above in the context of coordinating unmanned vehicles or optionally manned vehicles in order to impede or avoid collisions between the unmanned vehicles or the optionally manned vehicles, and companion unmanned vehicles or companion optionally manned vehicles.

Embodiments are disclosed above in the context of coordinating unmanned vehicles or optionally manned vehicles in order to impede or avoid collisions between the unmanned vehicles or the optionally manned vehicles, and an obstacle. Embodiments are intended to cover any obstacle, such as, but not restricted to, trees, hills, mountains, buildings, towers, corals, waterbodies, sand banks, orbital debris and so forth. Embodiments are also intended to cover any movable obstacle, such as, but not restricted to, birds, aircraft, watercraft, spacecraft, terrestrial vehicles, and so forth.

Exemplary embodiments are also intended to include and/or otherwise cover a V-formation of the unmanned vehicle swarm or a fleet of unmanned vehicles, which can cause each of the unmanned vehicles to be uniformly spaced. The equally spaced formation of the unmanned vehicles can allow each of the unmanned vehicles to impede collisions. However, embodiments of the disclosed subject matter are intended to include or otherwise cover any type of formation that may be beneficial.

Embodiments are intended to cover swarms of unmanned vehicles, swarms of optionally manned vehicles, or swarms having both unmanned vehicles and optionally manned vehicles. Embodiments are also intended to include or otherwise cover methods or techniques of coordination among unmanned vehicles and/or optionally manned vehicles in a swarm, such that each of the unmanned vehicles or optionally manned vehicles in the swarm can autonomously adjust their controlled parameters.

Embodiments are also intended to include or otherwise cover methods of manufacturing the unmanned vehicle disclosed above. The methods of manufacturing include or otherwise cover processors and computer programs implemented by processors used to design various elements of the unmanned vehicle disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations of coordinating a swarm of unmanned vehicles or optionally manned vehicles disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An unmanned vehicle for use with an entity physically spaced from the unmanned vehicle, the unmanned vehicle having at least one objective parameter corresponding to at least one controlled parameter of the entity, the unmanned vehicle comprising:
a transceiver that is configured to wirelessly receive an input signal, which includes a first frequency, from the entity at periodic intervals, wherein the input signal is indicative of the at least one controlled parameter of the entity; and
a Phase-Locked Loop (PLL) circuit that is configured to generate a command signal based on a phase of the input signal and a phase of a reference signal, which includes a second frequency, wherein the reference signal is indicative of the at least one objective parameter of the unmanned vehicle, the PLL circuit further including a phase detector that is configured to determine a deviation between the phase of the input signal and the phase of the reference signal, the at least one objective parameter including a predefined parameter, and the predefined parameter including energy consumption, starting point, orientation, speed, velocity, position data, and other directional data;
wherein the transceiver is further configured to wirelessly transmit the command signal to the entity, and wherein the entity is configured to control the at least one controlled parameter of the entity based on the command signal, and
wherein the command signal is indicative of a desired position of the entity, such that the entity moves to the desired position.

2. The unmanned vehicle of claim 1, wherein the desired position comprises at least one of a speed, an altitude, a heading, a latitude and a longitude.

3. The unmanned vehicle of claim 1, wherein the PLL circuit further comprises a signal generator that is configured to generate the reference signal.

4. The unmanned vehicle of claim 1, further comprising a controller communicably coupled to the transceiver, wherein the controller is configured to determine whether the input signal is received from one of the entity and a base station.

5. The unmanned vehicle of claim 1, wherein the unmanned vehicle is at least one of an unmanned aerial vehicle, an unmanned terrestrial vehicle, an unmanned aquatic vehicle, unmanned space vehicle and an optionally manned vehicle.

6. The unmanned vehicle of claim 1, wherein the PPL circuit provides a negative feedback to the entity to synchronize the vehicle velocity of the entity with vehicle velocity of the first unmanned vehicle.

7. A system, comprising:
a first unmanned vehicle and a second unmanned vehicle physically spaced from each other, a first unmanned vehicle having at least one objective parameter corresponding to at least one controlled parameter of the second unmanned vehicle, the first unmanned vehicle including:
a transceiver is configured to receive an input signal, which includes a first frequency, from the second unmanned vehicle; wherein the input signal is indicative of the at least one controlled parameter of the second unmanned vehicle; and
a Phase-Locked Loop (PLL) circuit is configured to generate a command signal based on a phase of the input signal and a phase of a reference signal, which includes a second frequency, wherein the reference signal is indicative of the at least one objective parameter of the first unmanned vehicle,
the PLL circuit of the first unmanned vehicle further including a phase detector that is configured to determine a difference between the phase of the input signal and the phase of the reference signal, the at least one objective parameter including a predefined parameter and, the predefined parameter including energy consumption, starting point, orientation, speed, velocity, position data, and other directional data;
wherein the transceiver is further configured to wirelessly transmit the command signal to the second unmanned vehicle;
wherein a controller of the second unmanned vehicle is configured to control the controlled parameters corresponding to the at least one objective parameter based on the command signal received from the first unmanned vehicle; and
wherein the command signal is indicative of a desired position of the second unmanned vehicle.

8. The system of claim 7, wherein the second unmanned vehicle further comprises a navigation unit that is configured to determine a current position of the second unmanned vehicle.

9. The system of claim 7, wherein the controller of the second unmanned vehicle is further configured to synchronize the navigation unit with a corresponding first navigation unit of the first unmanned vehicle based on the command signal.

10. The system of claim 7, wherein the controller of the second unmanned vehicle is further configured to control a movement of the second unmanned vehicle such that the second unmanned vehicle moves to the desired position.

11. The system of claim 10, wherein the desired position comprises at least one of a speed, an altitude, a heading, a latitude and a longitude.

12. The system of claim 7, wherein the first unmanned vehicle further comprises a controller that is communicably coupled to the receiver of the first unmanned vehicle, and wherein the controller of the first unmanned vehicle is further configured to determine whether the input signal is received from the second unmanned vehicle, a base station, or an unknown entity.

13. The system of claim 7, wherein the PLL circuit of the first unmanned vehicle further comprises a signal generator that is configured to generate the reference signal.

14. A method for use with an unmanned vehicle physically spaced from an entity, the unmanned vehicle having at least one objective parameters corresponding to at least one controlled parameter of the entity, the method comprising: receiving, by a transceiver of the unmanned vehicle, an input signal from the entity, wherein the input signal is indicative of the at least one controlled parameter of the entity; generating, by a Phase-Locked Loop (PLL) circuit of the unmanned vehicle, a command signal based on a phase of the input signal and a phase of a reference signal, wherein the reference signal is indicative of the at least one objective parameter of the unmanned vehicle; and transmitting, by the transceiver of the unmanned vehicle, the command signal to the entity, wherein the entity controls the at least one controlled parameter of the entity based on the command signal, wherein the Phase-Locked Loop (PLL) circuit is configured to generate a command signal based on a phase of the input signal and a phase of a reference signal, which includes a second frequency, wherein the reference signal is indicative of the at least one objective parameters of the first unmanned vehicle; wherein the PLL circuit of the first unmanned vehicle further includes a phase detector that is configured to determine a difference between the phase of the input signal and the phase of the reference signal; wherein the at least one objective parameter includes a predefined parameter; and wherein the predefined parameter includes energy consumption, starting point, orientation, speed, velocity, position data, and other directional data.

15. The method of claim 14, wherein the command signal is indicative of a desired position of the entity, such that the entity moves to the desired position.

16. The method of claim 14, further comprising tuning the phase of the input signal to the phase of the reference signal to generate the command signal.

17. The method of claim 14, further comprising determining a difference between the phase of the input signal and the phase of the reference signal.

* * * * *